(No Model.)
C. A. HARTMANN & G. A. McKEE.
GAS BURNER.
No. 499,731. Patented June 20, 1893.
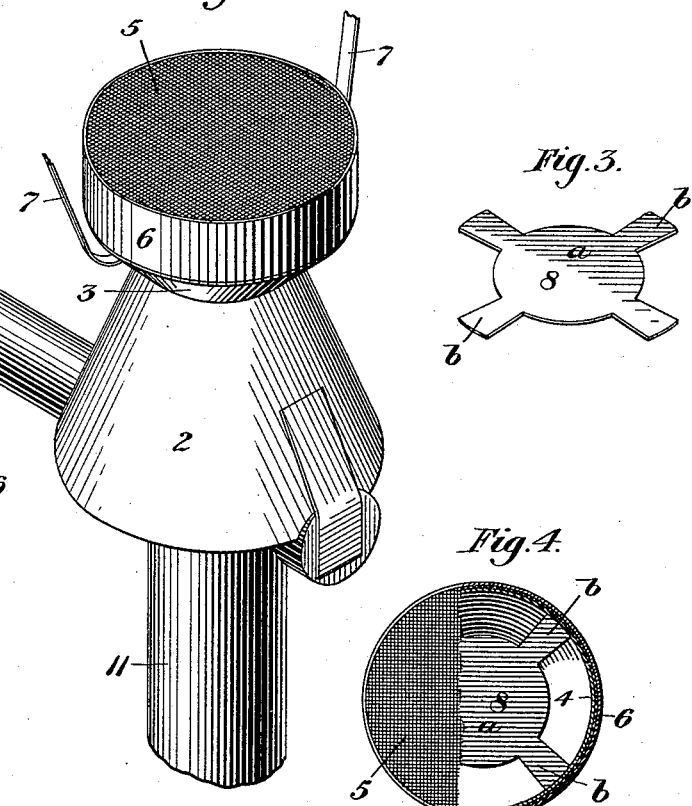
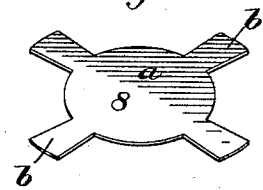
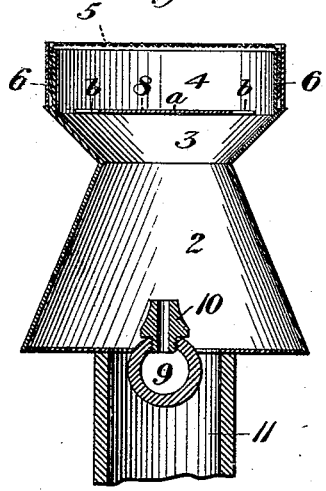
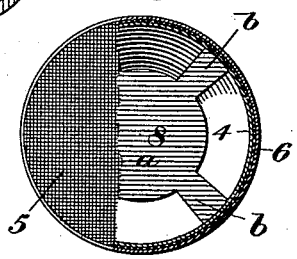
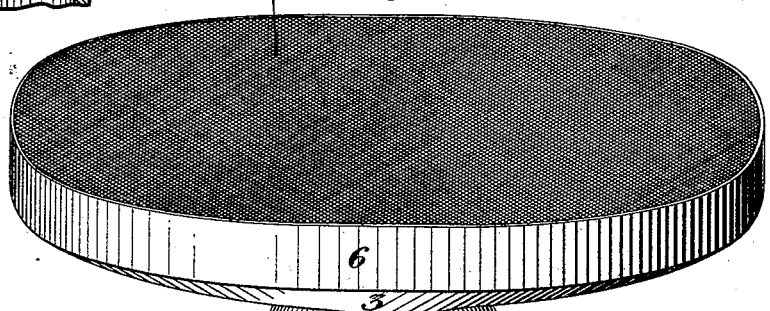
WITNESSES
J. H. Beal
M. W. Caskey
INVENTORS
Charles A. Hartmann
and George A. McKee,
by their Attorney,
Wm. L. Pierce.

UNITED STATES PATENT OFFICE.

CHARLES A. HARTMANN AND GEORGE A. McKEE, OF ETNA, PENNSYLVANIA.

GAS-BURNER.

SPECIFICATION forming part of Letters Patent No. 499,731, dated June 20, 1893.

Application filed December 5, 1892. Serial No. 454,021. (No model.)

*To all whom it may concern:*

Be it known that we, CHARLES A. HARTMANN and GEORGE A. McKEE, citizens of the United States, residing at Etna, in the county of Allegheny and State of Pennsylvania, have invented or discovered a new and useful Gas-Burner, of which the following is a specification.

In the accompanying drawings which make part of this specification, Figure 1, is a perspective of our gas-burner. Fig. 2, is a vertical section through same. Fig. 3, is a perspective of the spreader. Fig. 4, is a plan of the burner with gauze broken away, and Fig. 5 a perspective of an oblong burner for a range.

The purposes of our invention generally stated are to devise a gas burner which shall consume the gas economically and with practically perfect combustion; further to make the burner of few parts readily put together and detached.

In the accompanying drawings which make part of this specification, the mixer is preferably a single casting of iron, the shape being that of two frusta of cones 2 and 3 oppositely placed and surmounted by a low cylinder 4. Over said cylinder is placed a gauze cap 5 held in place by ring 6. Wings 7, 7, of sheet metal, riveted, or otherwise secured to the mixer, project therefrom and serve to hold the same in position within the stove or grate.

8 is a spider spreader which is inserted in the mixer at the base of cylindrical portion 4. The spider has a circular center, *a*, with supporting arms *b—b*, or an oblong center in the type of burner seen in Fig. 5.

9 is a gas pipe having a screw threaded nipple 10, as a vent for the gas.

11, is an air pipe feeding pure air from outside the building.

The form shown in Fig. 5, is practically the same as already described, except that the oblong shape of the burner throws the heat to the ends of the range as well as the center, and heats up the entire length of the back wall of the fire chamber.

The operation of the burner is as follows:

The broad base of the cone 2, permits the air to enter freely and the taper of the cone creates a draft. The combined air and gas are allowed to expand and mingle more fully in the part 3 of the mixer and then strike the spreader 8, which throws the gas out all around the margin of the spreader, which passes around the same and burns evenly over the whose surface of the gauze cap. The gauze cap prevents the mingled gases escaping too rapidly and insures perfect combustion.

Other ways of securing the burner in place besides the wings may be employed, and the nipple on the gas pipe may be omitted. We prefer the nipple, as it insures the gas being directed upward in a true vertical direction, instead of a slanting direction, which with a volatile gas is a matter of importance. Instead of supplying air from a cold air pipe, the vitiated air in a room may be used without any pipe at all. Any suitable perforated plate may be substituted for the gauze cap and ring.

We claim—

1. In a gas burner, the combination of a mixer; a spreader in the upper part of said mixer, having a solid center and radiating arms; a gauze cap over said mixer and a ring clamp to hold said cap in position, substantially as set forth.

2. The combination of a mixer consisting of two frusta of cones centrally placed and surmounted by a cylinder; a spreader in said cylinder; a gauze cap upon said cylinder and a ring clamp securing said cap, substantially as described.

3. In a gas burner, the combination of a mixer; a detachable spreader in the upper part of said mixer; a gauze cap over said mixer, and a ring clamp to hold said cap in a position, substantially as set forth.

In testimony whereof we have hereunto set our hands this 1st day of December, A. D. 1892.

CHAS. A. HARTMANN.
GEORGE A. McKEE.

Witnesses:
LOUIS WOHLGEMUTH,
JOHN H. BOATZLER.